United States Patent [19]
Penfold et al.

[11] 3,867,723
[45] Feb. 18, 1975

[54] MULTIPLE FLEXIBLE DISK FILE

[75] Inventors: Robert J. Penfold, Santa Cruz; Frank E. Talke, Los Gatos; Paul A. Thompson, San Jose, all of Calif.

[73] Assignee: International Business Machines Corporation, Armonk, N.Y.

[22] Filed: Nov. 7, 1973

[21] Appl. No.: 414,614

[52] U.S. Cl. .................... 360/98, 360/99
[51] Int. Cl. .................... G11b 5/82, G11b 25/04
[58] Field of Search .........360/97, 86, 98, 136, 99, 360/102–103, 105; 346/137

[56] References Cited

UNITED STATES PATENTS

| | | | |
|---|---|---|---|
| 3,303,485 | 2/1967 | Lee | 360/99 |
| 3,618,055 | 11/1971 | Van Acker et al. | 360/99 |
| 3,703,713 | 11/1972 | Pohm et al. | 360/99 |

*Primary Examiner*—Alfred H. Eddleman
*Attorney, Agent, or Firm*—Nathan N. Kallman

[57] ABSTRACT

A disk file includes a pressurized spindle for mounting a multiplicity of flexible disks, and apertured spacers for uniformly spacing and for stabilizing the flexible disks during rotation. Selected adjacent disks are parted by a wedge or knife-like element, and an accessing magnetic head is moved into transducing relation with a selected disk surface.

11 Claims, 8 Drawing Figures

MULTIPLE FLEXIBLE DISK FILE

BACKGROUND OF THE INVENTION

1. Field of the Invention

This invention relates to a magnetic disk storage file, and in particular to a novel disk file employing a multiplicity of flexible disks.

2. Description of the Prior Art

Presently known magnetic disk storage files generally employ disks made with rigid substrates that require extensive tedious manufacturing processes, such as grinding, polishing and testing. The cost of manufacture of rigid disks is relatively high, and time consuming. Furthermore, when multiple rigid disks are used in a stacked group, such as found in a disk pack, it is necessary to provide adequate spacing between the disks to avoid contact and the effects of aerodynamic forces that occur during high speed rotation of the disks. The spacing of the disks thus limits the number of disks that may be used, thereby limiting the data storage capacity of the file.

In direct contrast, flexible or floppy disks are relatively inexpensive to manufacture, and may be made simply with a magnetic oxide coating on a flexible backing such as Mylar (a DuPont trademark). Also, as this assembly is relatively thin compared to the rigid substrate disk, a large number may be stacked in a small space.

However, flexible disks require means for support during rotation, in order to provide a substantially uniform planar face to a magnetic head. In one approach, a number of flexible disks are stacked in contact with each other, and selected disks are separated to allow insertion of a magnetic head assembly. In such case, the disk surfaces experience undue wear from frictional effects during rotation. In another approach, the flexible disks are disposed, as shown in U.S. Pat. Nos. 3,509,533 (Krijnen) and 3,618,055 (Van Acker), in an enclosed chamber and an air flow or suction is provided. The disks are spaced by rings and the assembly is clamped together by collars. In the device described by Krijnen, the flexible disks are perforated and have circular sets of holes to admit air to be pumped through the disks. With this arrangement, the available recording area of the disk surface is drastically reduced. In addition, the non-uniformity of a discontinuous surface tends to introduce bending and instability resulting from stress concentrations near the apertures. In view of these restrictions, the diameter of the disks is limited to about 25 centimeters, as stated in Col. 3, lines 50–62 of the patent, and storage capacity is further limited. Furthermore, the need for a sealed enclosure with sealed parts and the necessity for an atmosphere surrounding the entire disk assembly that is different from the ambient environment, adds to the cost of construction and expense of maintenance of the disk apparatus.

SUMMARY OF THE INVENTION

An object of this invention is to provide a magnetic disk file employing a multiplicity of flexible disks having stability and uniformity during operational rotation.

Another object of this invention is to provide a multiple flexible disk file characterized by minimal wear of the disks and head assembly.

Another object is to provide a multiple flexible disk file that is very compact, and requires a reduced number of parts and components.

In accordance with an embodiment of this invention, a disk file having a multiplicity of flexible disks incorporates a slotted disk spindle that receives a controlled air flow from a pressurized source. Uniformly apertured spacers are disposed between the disks mounted to the spindle. During operation while the disks are rotated, the air flow is directed from the source axially through the spindle, outwardly from the spindle slots, and radially along the disk surfaces to ambient air. Air flows through the apertured spacers to establish a pressure equilibrium between adjacent disks, and to help maintain a uniform spacing between the rotating disks.

BRIEF DESCRIPTION OF THE DRAWING

The invention will be described in greater detail with reference to the drawing in which.

Similar numerals refer to similar elements throughout the drawing.

DESCRIPTION OF THE PREFERRED EMBODIMENT

Figures 1, 2:
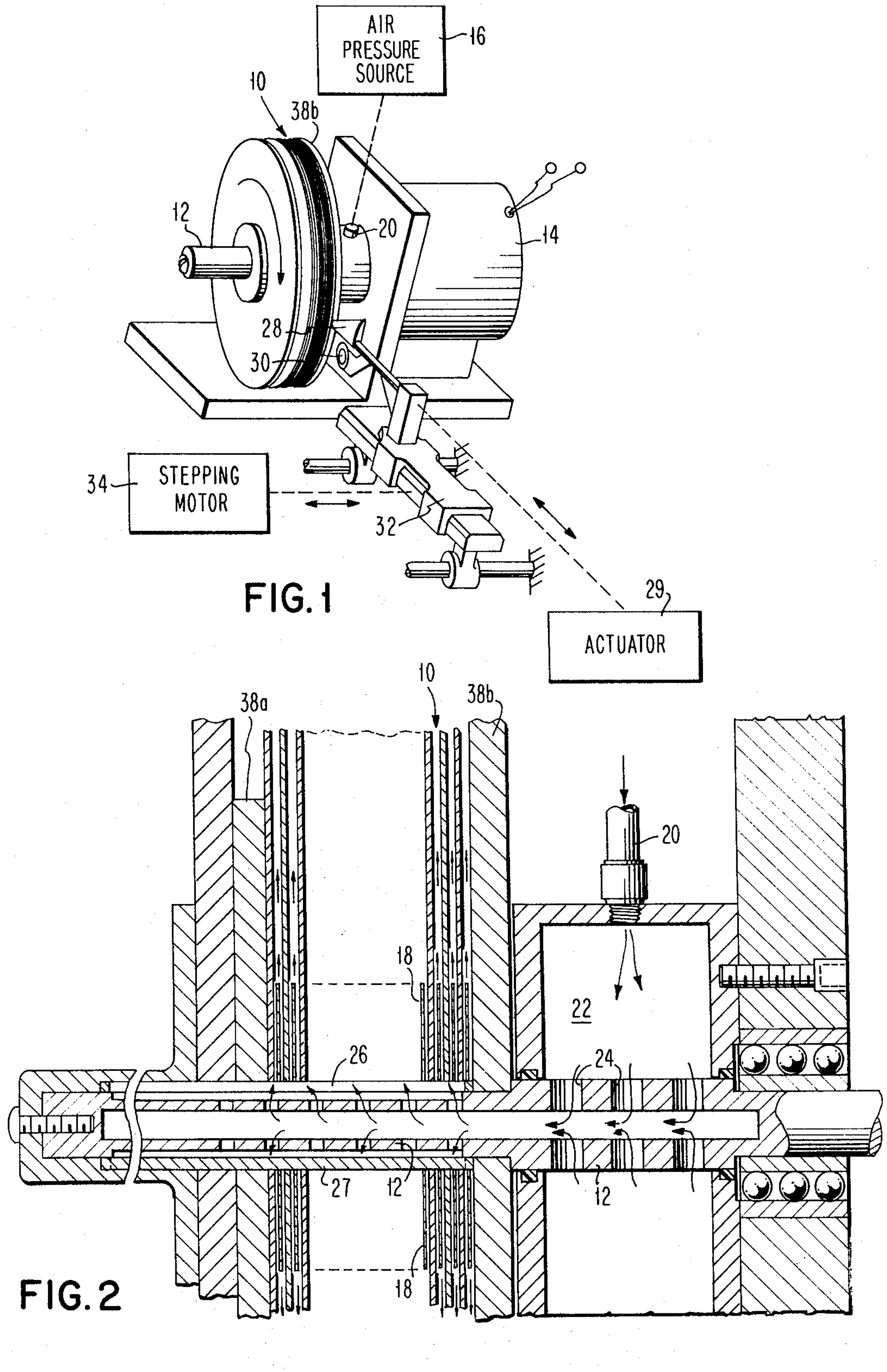
FIG. 1 is a three-dimensional view, partly in schematic, of a multiple flexible disk file made in accordance with this invention.
FIG. 2 is a cross-sectional view of the novel disk file illustrated in FIG. 1.
Figure 6A:
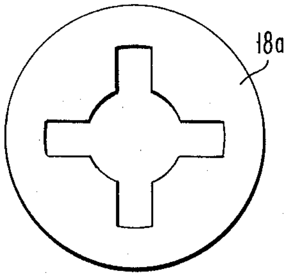
Figure 6B:
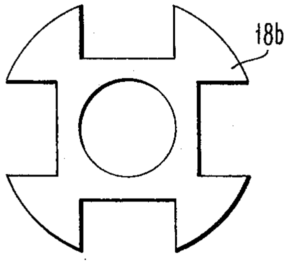
Figure 6C:
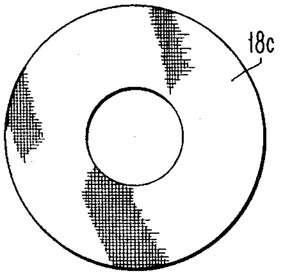
Figure 5:
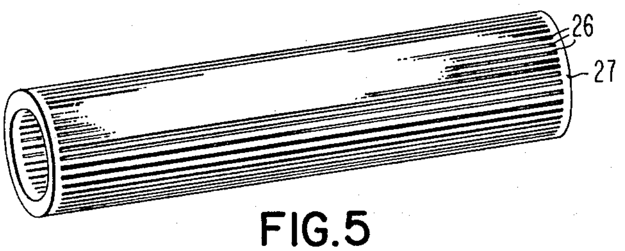
FIG. 5 is an isometric view of the slotted spindle collar employed in the assembly of this invention; and FIGS. *6a–c* are plan views of spacer elements that may be used between the flexible disks of the file disclosed in this application.
Figure 3:
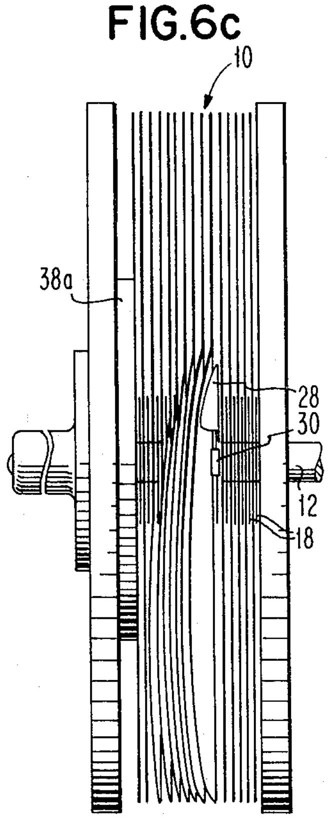
FIG. 3 is a schematic view of a stack of rotating flexible magnetic disks that have been separated at one point by a separating device to enable accessing by a magnetic head.
Figure 4:
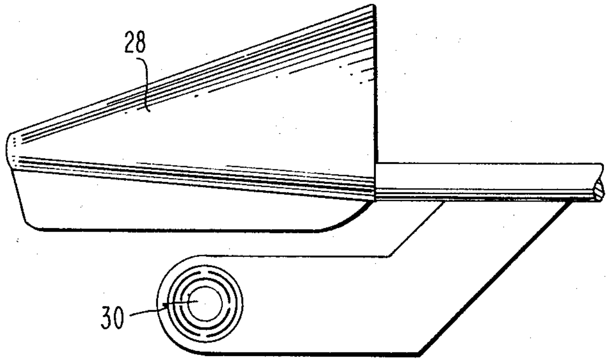
FIG. 4 is a side view of a separating device joined with a magnetic head assembly, as may be used with this invention.

With reference to FIG. 1, a multiple flexible disk file assembly includes a stack of flexible magnetic disks 10 mounted to a rotary spindle assembly 12, that is rotated by a drive motor 14, as is known in the art. An air pressure source 16 is provided to apply air at a predetermined pressure to the interior of the hollow spindle 12, which has uniform slots or apertures 24 to allow air to flow out and be distributed between each of the disks 10 in a direction that is radially outward.

A feature of the instant invention is the provision of symmetrically configured spacers **18*a* or 18*b* or 18*c***, illustrated respectively in FIGS. *6a–c*, that are disposed between the disks to enable a close and uniform spacing of the disks during rotation. Spacers **18*a* and 18*b* have cutouts and apertures forming a uniform geometrical design; whereas spacer 18*c* may be a fine wire mesh, made from polyester, nylon, metal or other durable material. Spaces 18*a* and 18*b* must be used in combination, whereas fine mesh type spacers 18*c*** may be used as individual elements between adjacent disks.

In operation, air pressure is provided from the source 16 through coupling device 20 (see FIG. 2) into a chamber 22, coupled to the rotary spindle assembly 12. Pressurized air is directed through the apertures 24 into the center of the hollow spindle and forced through longitudinal slots 26 that are disposed in a collar 27 that encompasses a portion of the spindle adjacent to the stack of disks. The air is expelled outwardly from the inner radius and flows to the outer periphery of each of the disks and then to ambient air. The air that flows between teh disks and through the spacers provides an equalizing condition, such that the disks rotate in equilibrium in a substantially stiff planar shape.

With the disks 10 in rotation and spaced closely and uniformly, a wedge-like separator element 28 is moved between selected disks by a linear actuator 29, such as a hydraulic motor or voice coil motor, by way of example. The element 28 has a flat side that maintains the record disk to be accessed in a planar attitude for proper transducing coaction with a magnetic head assembly 30. The separator element 28 may have a flow of air provided to minimize contact with the disks that are being separated by the element. The head assembly 30 is attached to a carriage or accessing structure 32, which supports the separator element 28. During the accessing or seek mode, the separator element 28 leads the head assembly 30 into the disk pack. The head 30 then may be moved bidirectionally and radially to record and read on selected data tracks of the selected disk surface.

To position the accessing structure 32 at a desired axial position so that the head assembly 30 may be brought into transducing relation with a selected disk, a positioner or stepping motor 34 is coupled to the accessing structure 32. Signals that are applied to the stepping motor 34 move the accessing structure 32 to a selected position such that the separator element 28 will move between two selected disks, and the head assembly 30 will be in transducing relation with a selected disk surface.

To ensure stability of the entire stack of disks, which may include 200 disks by way of example, backing support plates 38*a*, *b* are clamped at each side of the disk stack on the spindle 12.

In one particular embodiment, flexible disks formed with Mylar backing having a thickness of .0015 inch and of 12 inch diameter were mounted on a spindle with a screen type polyester spacer having a uniform thickness of approximately .003 inch, and with apertures approximately .003 inch diameter. The hollow spindle of 1 inch diameter received pressurized air at a flow rate of 2.88 foot$^3$ per minute.

There has been described herein a novel multiple flexible disk file, employing a hollow spindle for mounting the disks, to which pressurized air is applied and directed through apertured spacer elements that are interleaved with the flexible disks. By means of this arrangement, spacings between disks may be maintained at about .003 inch during rotation, and with the means for separating disks, a head assembly may be introduced within the circumference of a selected disk or transducing operation.

It should be understood that the materials and dimensions specified herein are given by way of example, and may be varied in accordance with the invention. Also, modifications may be made to the configuration, well within the scope of the present invention.

What is claimed is:

1. In a storage apparatus having flexible magnetic disks mounted to a spindle assembly for rotation, the combination comprising:

discrete uniformly apertured spacers concentrically seated on said spindle assembly and disposed between adjacent disks; and means for providing a flow of fluid outwardly from said spindle assembly and through said spacers, so that a uniform air flow is provided radially relative to said disks, wherein said spacers are of smaller diameter than said disks.

2. A magnetic storage apparatus comprising:

a stack of flexible record disks;

a hollow rotary spindle assembly having its rotary axis disposed substantially horizontally for mounting said disks concentrically along said axis, said spindle assembly having uniform openings along the axial direction;

means for rotating said spindle assembly with said disks;

uniformly apertured spacers concentrically seated on said spindle assembly and disposed between adjacent ones of said disks, and not attached to said disks, for evenly spacing said disks one from each other when said spindle assembly and disks are rotated; and means for applying a flow of air through the hollow interior of said spindle and through said uniform openings to provide uniform air movement radially relative to said rotating disks and through said apertured spacers, so that said disks are effectively separated and evenly spaced from each other, and maintained mechanically stable during rotation.

3. A magnetic storage apparatus as in claim 2, wherein said spacers are formed from porous polyester.

4. A magnetic storage apparatus as in claim 2, wherein said spacers are formed with cross-woven mesh.

5. A magnetic storage apparatus as in claim 2, wherein said spindle assembly is formed with air relief slots.

6. A magnetic storage apparatus as in claim 2, wherein said fluid flow applying means comprises a pressurized air source.

7. A magnetic storage apparatus as in claim 2, further including means for inserting an accessing magnetic transducer assembly between selected disks to enable transducing operation across selected surfaces of said disks.

8. A magnetic storage apparatus as in claim 7, wherein said inserting means comprises a wedge-like separator element.

9. A magnetic storage apparatus as in claim 8, including means for providing pressurized air to said separator element.

10. A magnetic storage apparatus as in claim 2, including an accessing structure, a head assembly mounted to said accessing structure, and means for moving said accessing structure axially relative to said spindle assembly, and for moving said head assembly orthogonally relative to the axis of said spindle assembly.

11. A magnetic storage apparatus as in claim 2, further including backing support plates clamped at each end of the disk stack for providing stability to said disk stack.

* * * * *